(12) United States Patent
Ashley et al.

(10) Patent No.: US 9,521,226 B2
(45) Date of Patent: *Dec. 13, 2016

(54) MOLDED SHOCK RESISTANT CASE FOR AN ELECTRONIC DEVICE

(71) Applicant: M-Edge International Corp., Hanover, MD (US)

(72) Inventors: Adam R. Ashley, Crownsville, MD (US); Christopher R. Helman, Linthicum, MD (US)

(73) Assignee: M-Edge International Corp., Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,791

(22) Filed: Jan. 19, 2016

(65) Prior Publication Data

US 2016/0134735 A1    May 12, 2016

Related U.S. Application Data

(63) Continuation of application No. 14/522,756, filed on Oct. 24, 2014, now Pat. No. 9,241,053.

(60) Provisional application No. 61/895,685, filed on Oct. 25, 2013.

(51) Int. Cl.
| | |
|---|---|
| *H04M 1/04* | (2006.01) |
| *H04B 1/3888* | (2015.01) |
| *G06F 1/16* | (2006.01) |
| *H04M 1/18* | (2006.01) |

(52) U.S. Cl.
CPC .............. *H04M 1/04* (2013.01); *G06F 1/1626* (2013.01); *H04B 1/3888* (2013.01); *G06F 2200/1633* (2013.01); *H04M 1/185* (2013.01)

(58) Field of Classification Search
CPC ....... H04B 1/3888; H04B 1/04; G06F 1/1626; G06F 1/1656; G06F 2200/1633; H05K 5/0266; H05K 5/0226; A45F 5/00; A45C 11/00; A45C 15/00; A45C 2011/003; A45C 2011/002; H04M 1/08; H04M 1/725; H04M 1/825
See application file for complete search history.

(56) References Cited

U.S. PATENT DOCUMENTS

| | | | |
|---|---|---|---|
| 2005/0174727 A1* | 8/2005 | Thomas | G06F 1/1626 361/679.56 |
| 2008/0237432 A1 | 10/2008 | Patterson | |
| 2009/0114556 A1 | 5/2009 | Tai et al. | |
| 2009/0294235 A1 | 12/2009 | Santy et al. | |
| 2012/0092822 A1 | 4/2012 | Mooring et al. | |

(Continued)

*Primary Examiner* — Thanh Le
(74) *Attorney, Agent, or Firm* — Drinker Biddle & Reath LLP

(57) ABSTRACT

A mounting system for an electronic device includes an outer section having an inner surface and an outer surface, the inner surface adapted to face the electronic device when the electronic device is mounted in the mounting system. The mounting system also includes a perimeter suspension section coupled to the outer section and adapted to secure the electronic device to the mounting system, the perimeter suspension section including a spring portion provided around a periphery of the perimeter suspension section, the spring portion being adapted to isolate the electronic device from a shock force that may be applied to the mounting system.

24 Claims, 15 Drawing Sheets

(56) References Cited

U.S. PATENT DOCUMENTS

| | | | |
|---|---|---|---|
| 2012/0314354 A1* | 12/2012 | Rayner | G06F 1/1626 361/679.01 |
| 2013/0186682 A1 | 7/2013 | Gallagher et al. | |
| 2013/0193149 A1* | 8/2013 | Balourdet | A45F 5/00 220/560.01 |
| 2014/0024419 A1 | 1/2014 | Norris et al. | |
| 2015/0166237 A1 | 6/2015 | Richardson et al. | |

* cited by examiner

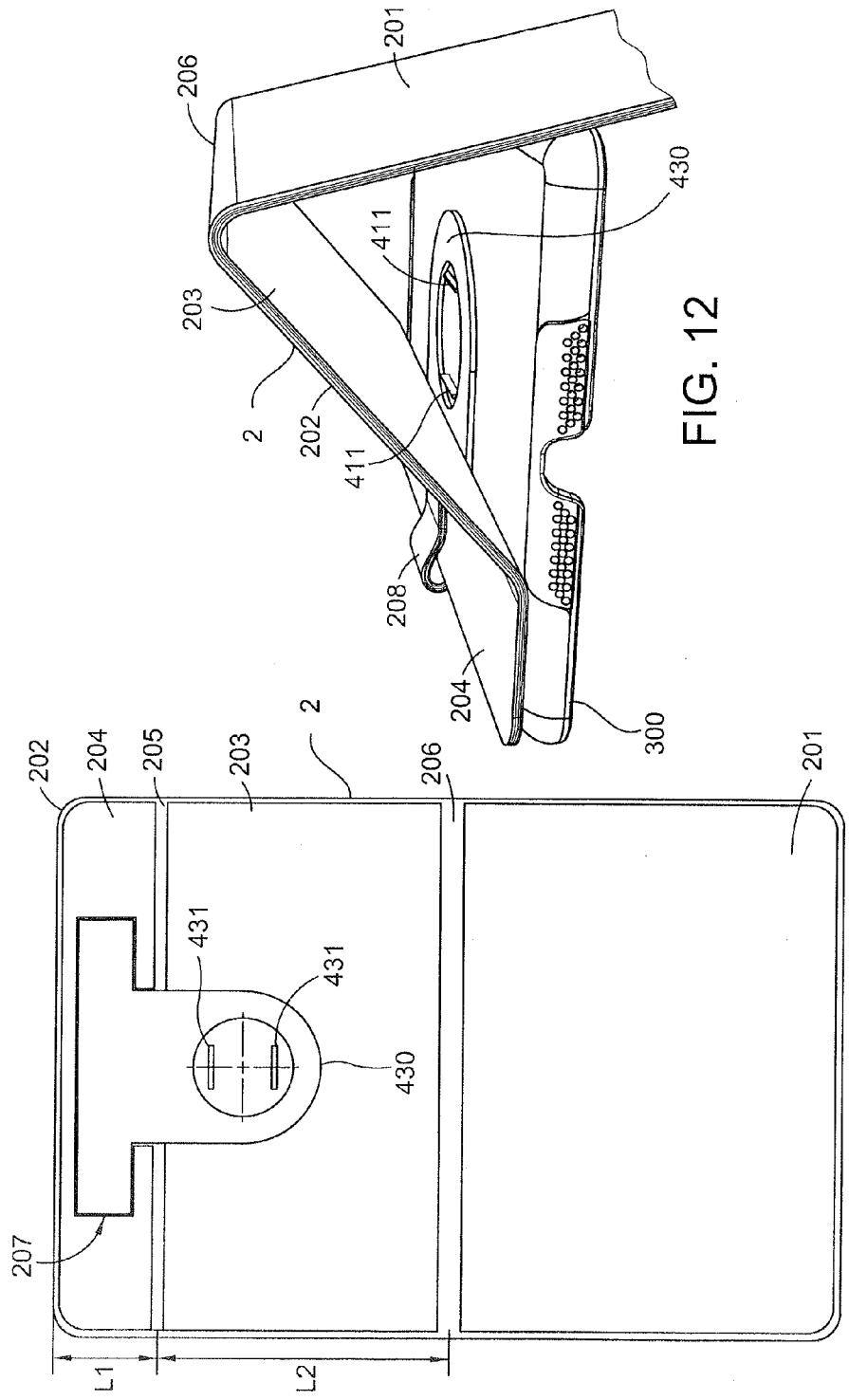

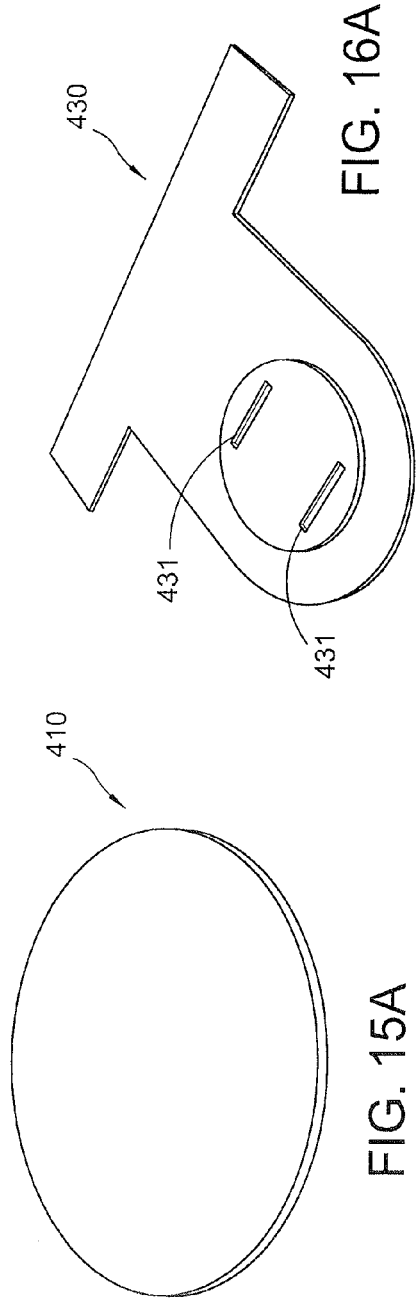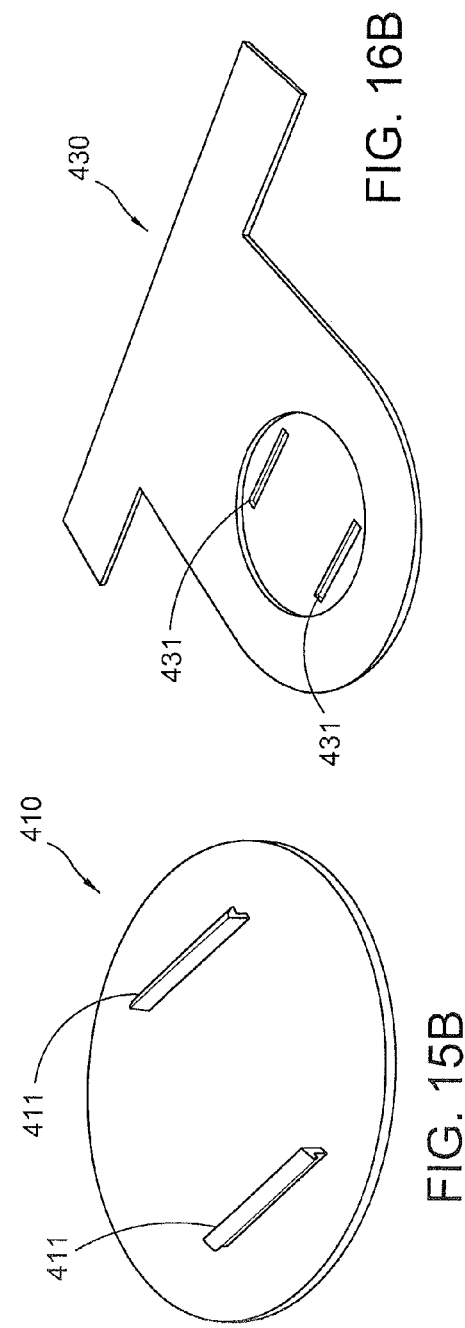

MOLDED SHOCK RESISTANT CASE FOR AN ELECTRONIC DEVICE

CROSS-REFERENCE TO RELATED APPLICATIONS

This is a continuation application of U.S. application Ser. No. 14/522,756, filed Oct. 24, 2014, which claims priority under 35 U.S.C. §119 to U.S. Provisional Patent Application No. 61/895,685, filed on Oct. 25, 2013, each of which is incorporated by reference herein in its entirety.

BACKGROUND OF THE INVENTION

Many folios or cases for tablet devices currently sold on the market only provide cosmetic protection for the tablet device. Specifically, if the case is dropped with the tablet inside, the case is not designed to protect the device from damage. This is a fundamental concern for the user that embodiments of the invention are designed to address.

Other cases that provide some protection to the tablet device include multiple, shock absorbing layers of differing materials to provide the desired protection to the tablet device. However, these cases rely entirely on the shock absorbing properties of the materials of the various layers, rather than the shape of the layers.

SUMMARY OF THE INVENTION

In an embodiment, the invention provides a mounting system for an electronic device that includes an outer section having an inner surface and an outer surface, the inner surface adapted to face the electronic device when the electronic device is mounted in the mounting system. The mounting system also includes a perimeter suspension section coupled to the outer section and adapted to secure the electronic device to the mounting system, the perimeter suspension section including a spring portion provided around a periphery of the perimeter suspension section, the spring portion being adapted to isolate the electronic device from a shock force that may be applied to the mounting system.

In another embodiment, the invention provides a protective case for an electronic device that includes a front cover, a rear cover that further includes a middle rear cover, an exterior rear cover, and a folding portion that connects the middle rear cover to the exterior rear cover, and a spine portion that connects the front cover to the rear cover. An attachment portion is provided in the exterior rear cover. The protective case also includes a mounting system having an outer section with an inner surface and an outer surface, the inner surface adapted to face the electronic device when the electronic device is mounted in the mounting system, and a perimeter suspension section coupled to the outer section and adapted to secure the electronic device to the mounting system. The perimeter suspension section includes a spring portion provided around a periphery of the perimeter suspension section, the spring portion adapted to isolate the electronic device from a shock force that may be applied to the mounting system, wherein the mounting system is connected to the exterior rear cover at the attachment portion.

BRIEF DESCRIPTION OF THE DRAWINGS

The accompanying drawings, which are incorporated herein and constitute part of this specification, illustrate the presently preferred embodiments of the invention, and together with the general description given above, and the detailed description given below, serve to explain features of the invention.

FIG. 11 is a view of the device case in an open position with the pivot assembly shown in FIG. 9 attached to the case;

FIG. 12 is a partial side perspective view of the case and pivot assembly shown in FIG. 11 with a mounting system;

FIG. 15A is a bottom perspective view of the cap shown in FIG. 10;

FIG. 15B is a top perspective view of the cap shown in FIG. 10;

FIG. 16A is a top perspective view of a pivot/core of the pivot assembly shown in FIG. 9;

FIG. 16B is a bottom perspective view of the pivot/core shown in FIG. 9; and

DETAILED DESCRIPTION OF THE INVENTION

Figure 1:
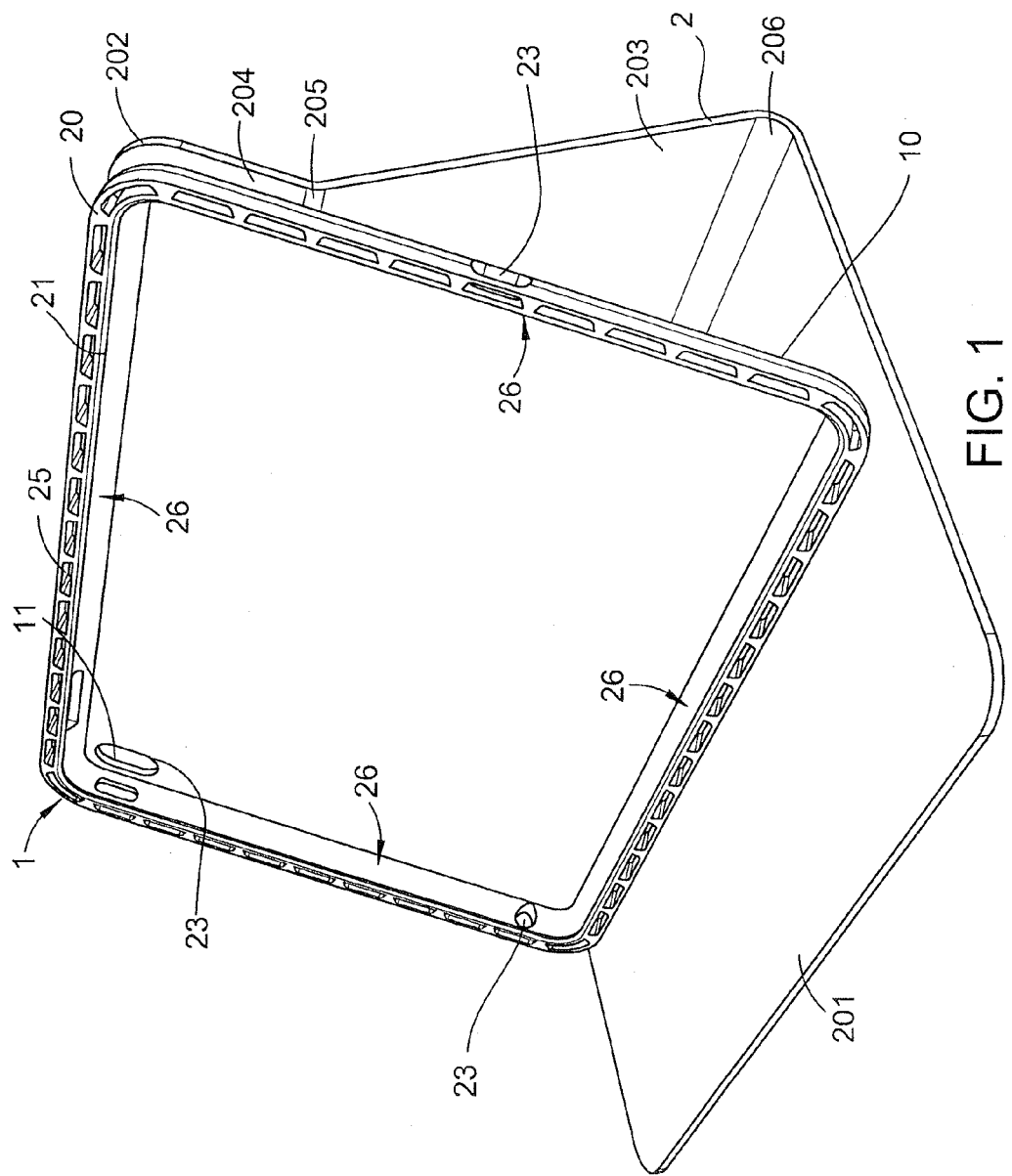
FIG. 1 is a perspective view of a first embodiment of a mounting system, shown integrated with a device case.
Figure 2:
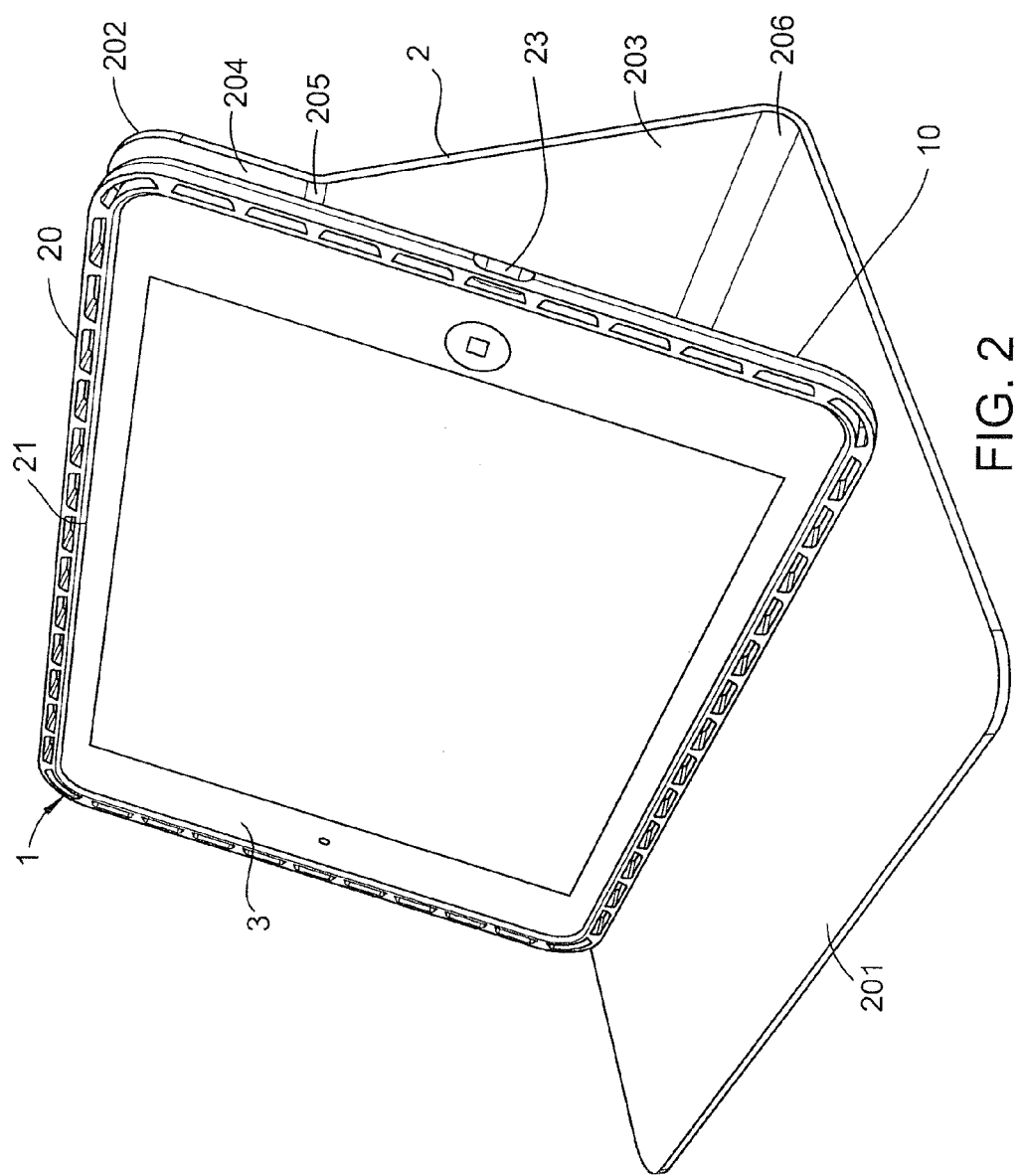
FIG. 2 is a perspective view of the mounting system shown in FIG. 1, with a tablet device.
Figure 3:
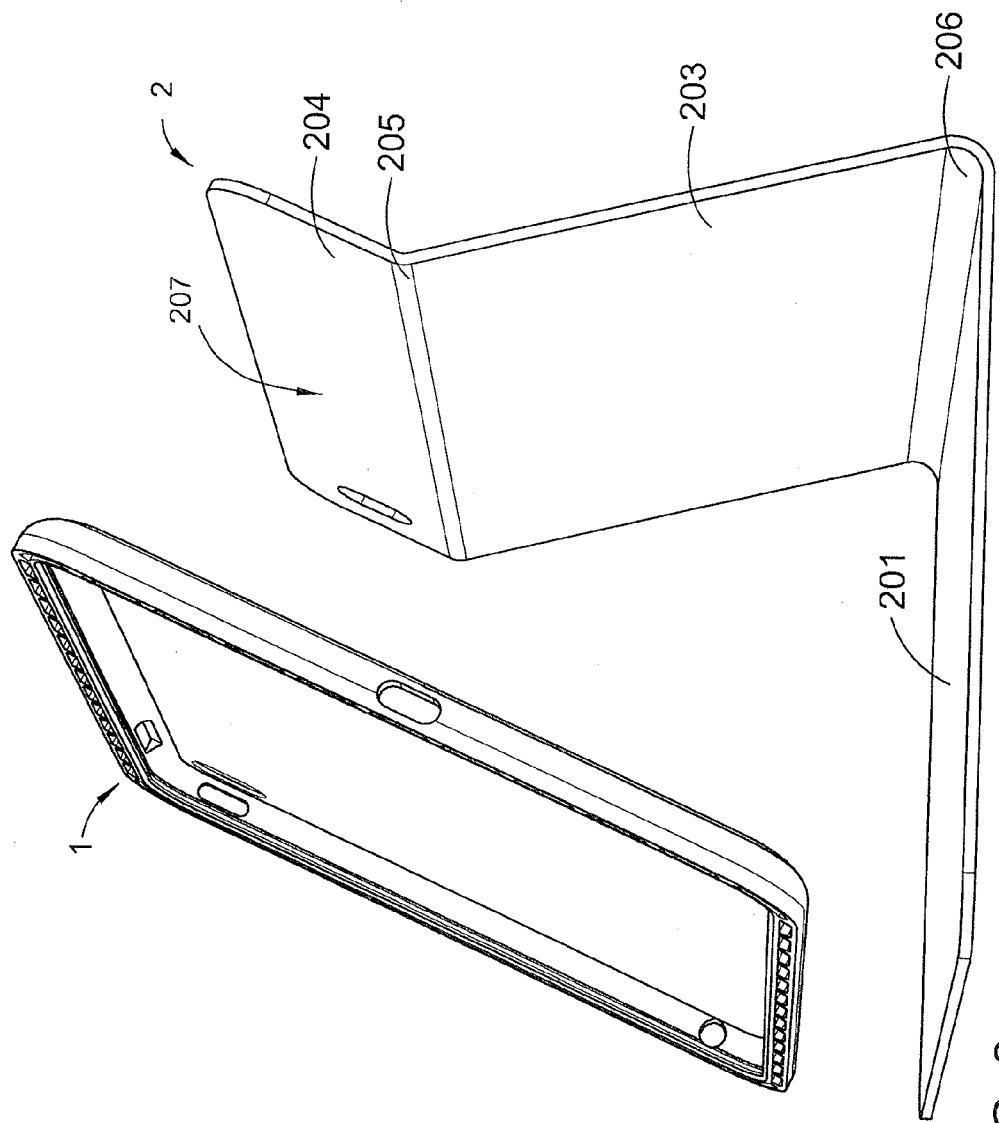
FIG. 3 is an exploded view of the mounting system and device case shown in FIG. 1.

According to an embodiment, as shown in FIGS. 1-5, mounting system 1 is provided for mounting an electronic device 3, such as a tablet device, and for protecting the electronic device 3 from impact forces. The mounting system 1 is shown in FIGS. 1-3 integrated with a "jacket" style case 2. Even when case 2 is made of, for example, a fabric material or some other material offering little protection, the mounting system 1 can still provide impact protection to the electronic device 3.

Mounting system 1 includes an outer section 10 that is co-molded with a perimeter suspension section 20. The perimeter suspension section 20 is molded into a shape that functions as a spring. The spring shape of the perimeter suspension section 20 provides impact protection for an electronic device 3 that is mounted in the mounting system 1 by dampening impact vibration, while also providing a key visual indicator so a potential customer can easily understand the function of the mounting system 1.

Figure 4:
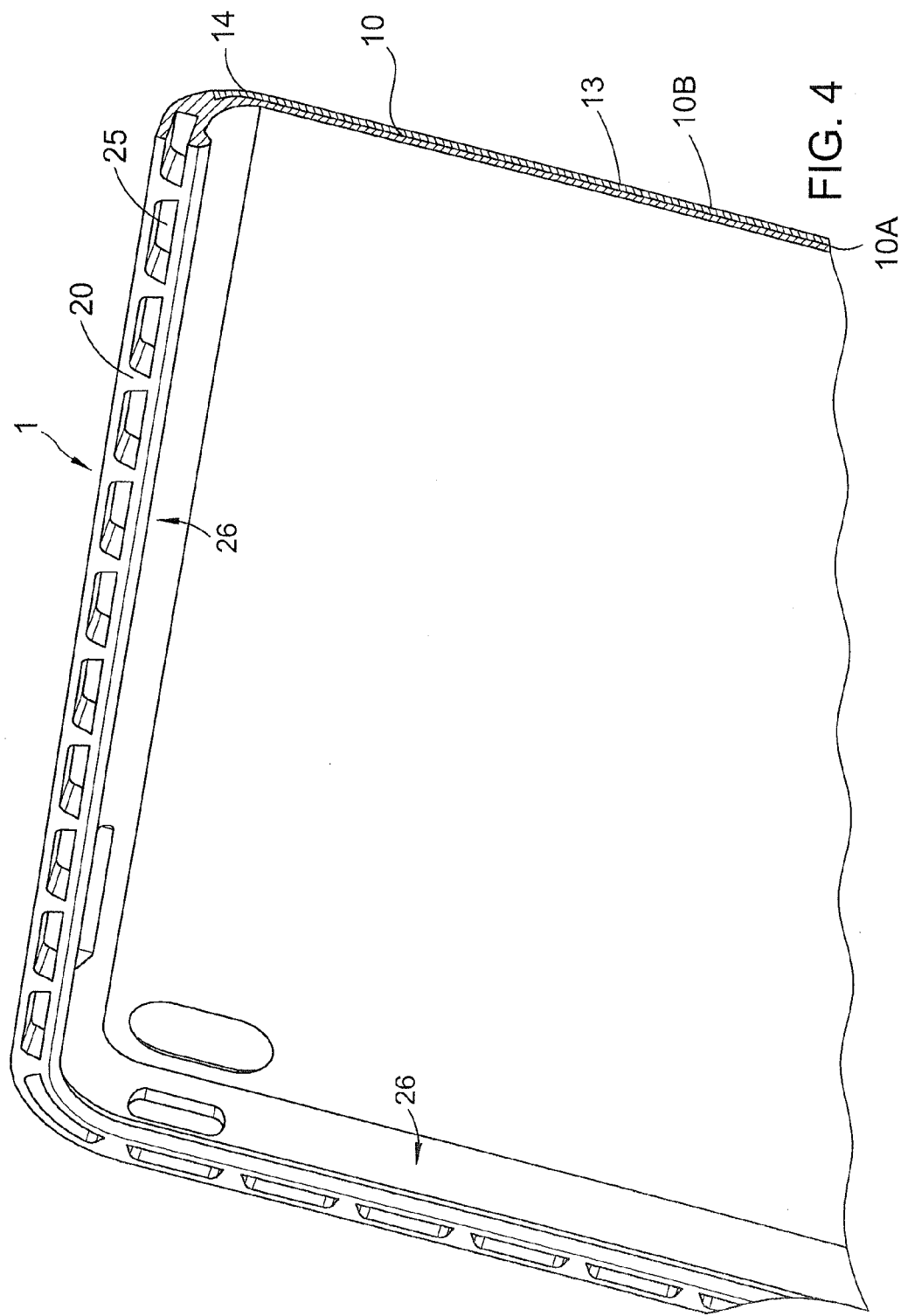
FIG. 4 is a detailed cross-sectional view of the mounting system shown in FIG. 1.

The outer section 10 is co-molded with the perimeter suspension section 20 and provides the attachment to the case 2 in which the mounting system 1 is integrated. As shown in FIG. 4, the perimeter suspension section 20 is disposed over the entire inner surface 10A of the outer section 10. The inner surface 10A of the outer section 10 is adapted to face the electronic device 3 when the device 3 is mounted in the mounting system 1. An outer surface 10B of the outer section 10 is adapted to face a surface of the case 2 where the mounting system 1 is attached. Thus, when the electronic device 3 is mounted in mounting system 1, the perimeter suspension section 20 is disposed between the electronic device 3 and the outer section 10.

Figure 5:
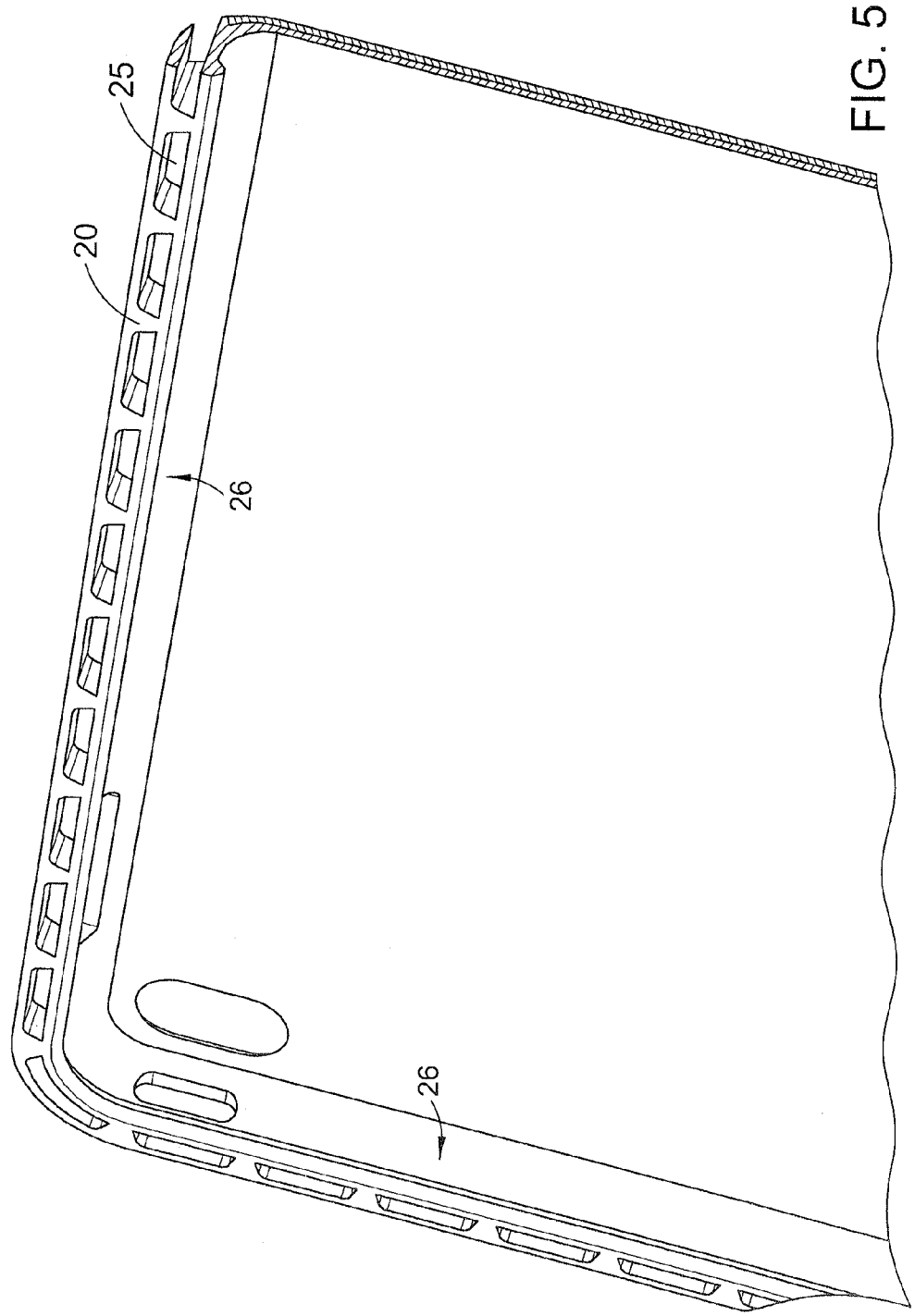
FIG. 5 is a detailed cross-sectional view of the mounting system shown in FIG. 1 with voids formed as through holes.

With reference to FIG. 4, the outer section 10 includes a central portion 13 that is substantially planar. Surrounding the central portion 13 is an outer portion 14 that is inclined relative to the central portion 13 in a direction toward the inner surface 10A of the outer section 10. The outer portion 14 may be formed to have a radius of curvature. The perimeter suspension section 20 is disposed on the inner surface 10A of the outer section 10 such that a spring portion 26 is positioned adjacent to the outer portion 1 of the outer section 10. With further reference to FIG. 1, the spring portion 26 is provided about the periphery of the perimeter suspension section 20 and includes a plurality of voids 25 that serve to provide additional impact protection to the device 3. As shown in FIG. 4, the voids 25 can be formed as partial or blind holes such that the voids 25 do not pass through the entire thickness of the perimeter suspension section 20. As shown in FIG. 5, the voids 25 can be formed as through holes such that the voids 25 pass through the entire thickness of the perimeter suspension section 20. Forming the voids 25 in the perimeter suspension section 20 results in the use of less material in the manufacturing process, thereby reducing the cost of production as well as the overall weight of the mounting system 1. In addition, forming the voids 25 as through holes as in FIG. 5 causes the mounting system 1 to be more compliant and improves the mounting system's 1 ability to isolate the device 3 from impact forces.

The outer section 10 and the perimeter suspension section 20 are adapted to secure the electronic device 3 when mounted in the mounting system 1. The central portion 13 of the outer section 10 has dimensions such that the central portion 13 is essentially coextensive with the electronic device 3. The outer portion 14 of the outer section 10, by way of its incline relative to the central portion 13, extends around the edges of the electronic device 3. The perimeter suspension section 20 is adapted to fit around the periphery of the electronic device 3 and to hold the device 3 in place by way of a flange 21. The flange 21 is provided around the periphery of the perimeter suspension section 20 and covers a portion of the front surface of the device 3 when the device 3 is mounted in the mounting system 1.

The outer section 10 may include device openings 11 to provide access to switches, ports, and buttons required for the operation of the device 3. The perimeter suspension section 20 also includes device openings 23 and buttons 24 to provide access to switches, ports, and buttons required for the operation of the device 3.

The outer section 10 may be formed of a rigid material, for example polycarbonate. The perimeter suspension section 20 may be formed of any suitable material that provides impact protection to the electronic device 3 on account of being formed in a shape that functions as a spring thereby making it more shock absorbent than a solid layer of material. Preferably, the perimeter suspension section 20 is made of an elastic material, for example a silicone or a thermoplastic polyurethane (TPU). More preferably, the perimeter suspension section 20 is thermoplastic polyurethane (TPU) having a durometer of 70 according to the ASTM D2240 type A scale.

The molded mounting system 1 is a protective case for electronic devices 3. The perimeter suspension section 20 provides unprecedented impact protection from a small case 2. When the case 2 is subjected to an impact—e.g., when the case 2 is dropped—the outer section 10 receives the impact, and the perimeter suspension section 20 isolates the electronic device 3 from that impact. The spring portion 26 including the plurality of voids 25 serve to isolate the electronic device 3 from the shock forces of the impact.

Figure 6:
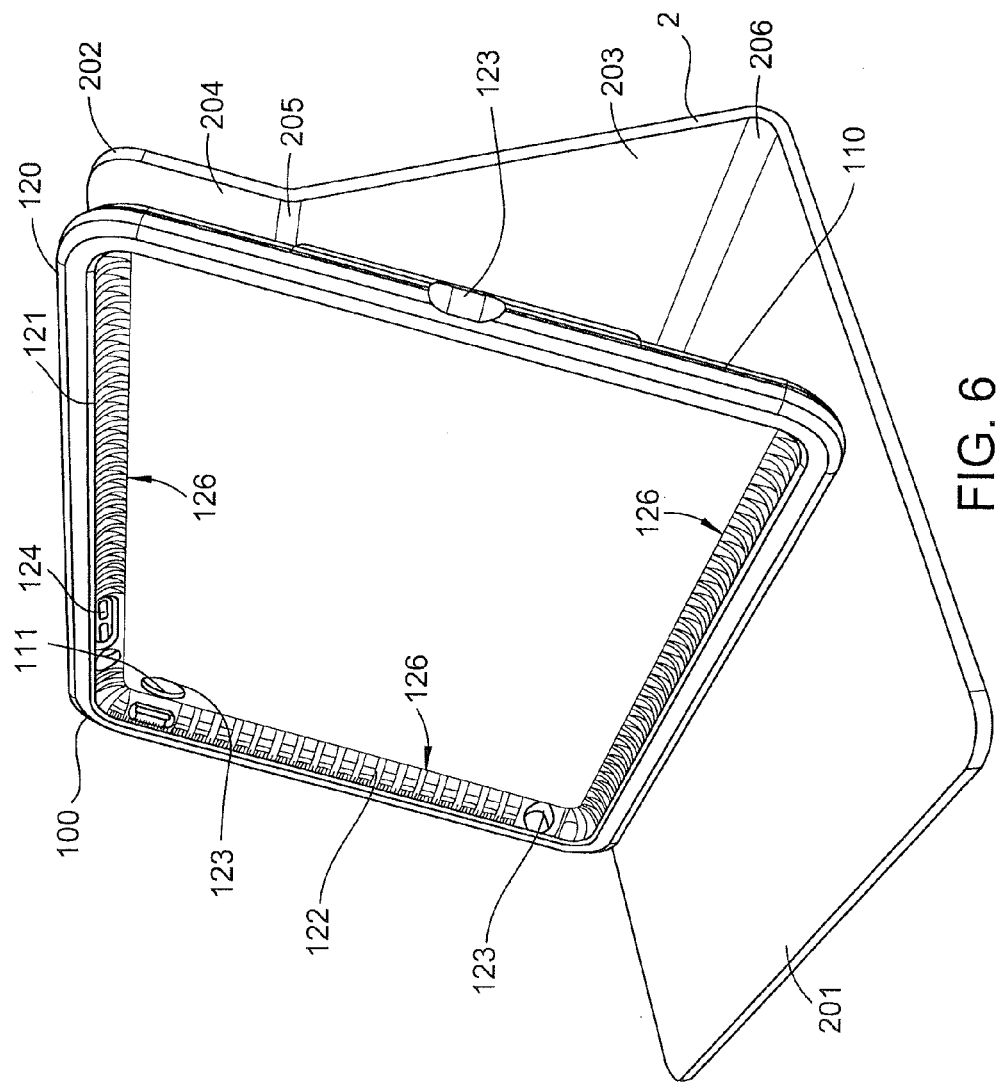
FIG. 6 is a perspective view of a second embodiment of a mounting system, shown integrated with the device case.
Figure 7:
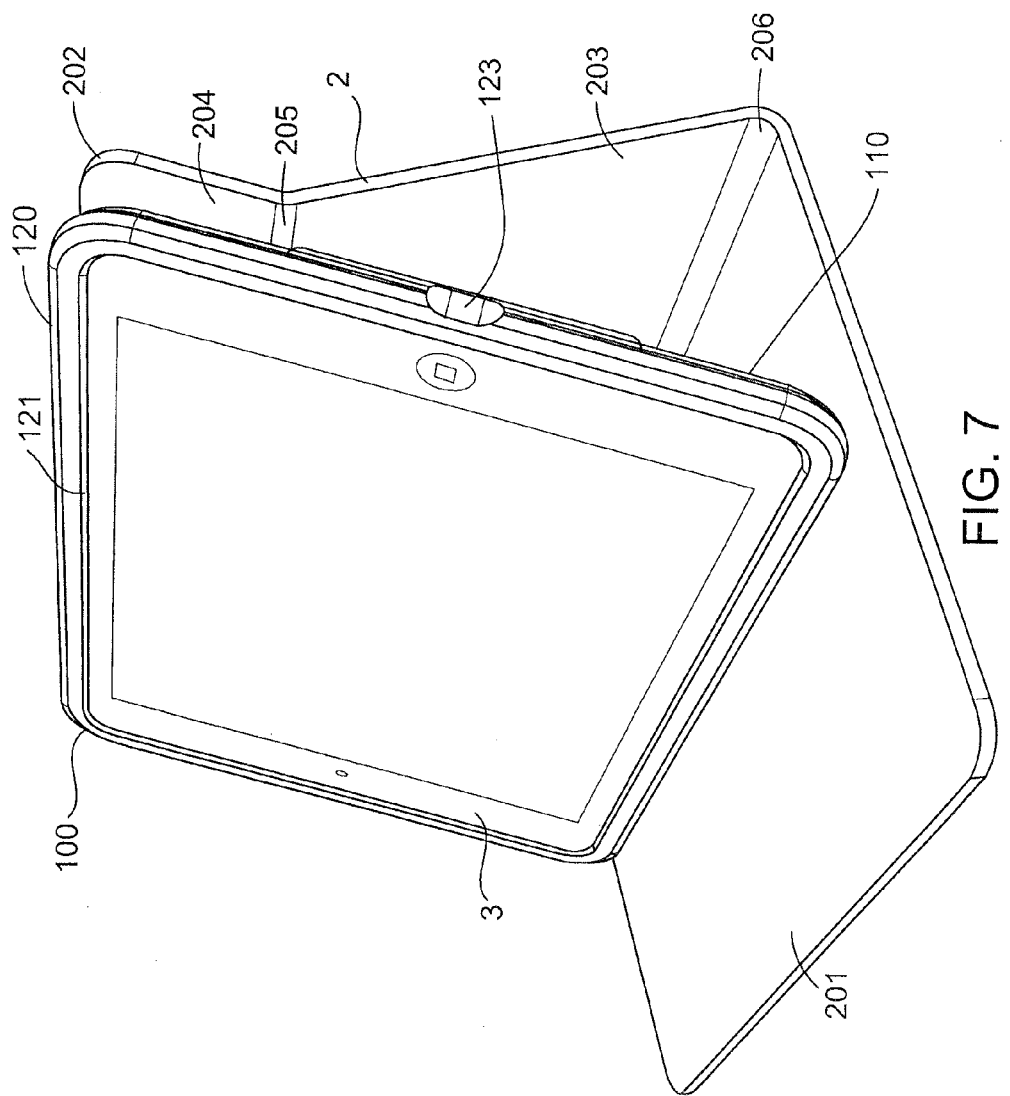
FIG. 7 is a perspective view of the mounting system shown in FIG. 6, with the tablet device.
Figure 8:
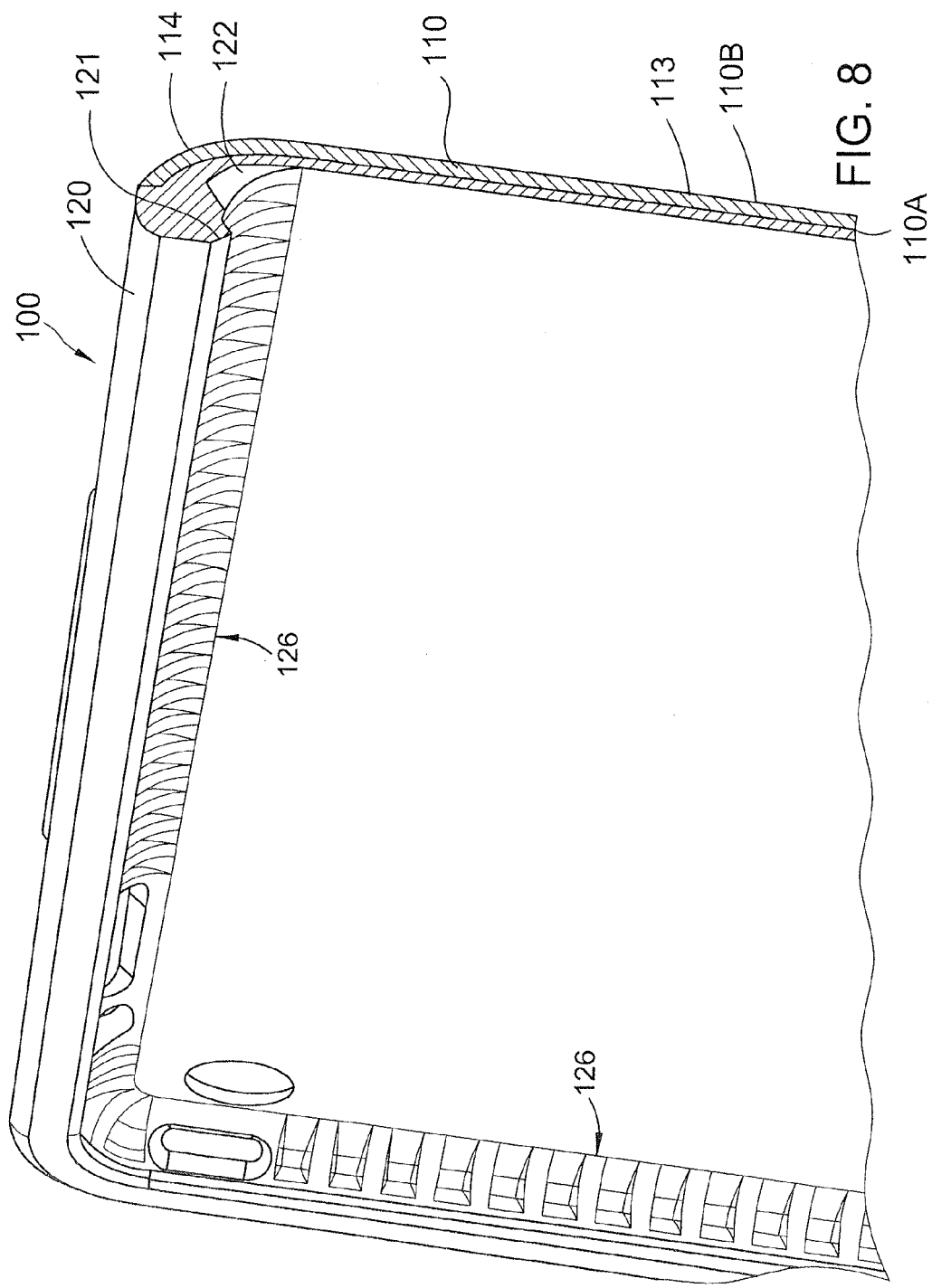
FIG. 8 is a detailed cross-sectional view of the mounting system shown in FIG. 6.

According to another embodiment, as shown in FIGS. 6-9, a mounting system 100 is provided for mounting the electronic device 3 and for protecting the device 3 from impact forces. The mounting system 100 is shown in FIGS. 6 and 7 integrated with case 2. Mounting system 100 includes an outer section 110 that is co-molded with a perimeter suspension section 120. As shown in FIG. 8, the perimeter suspension section 120 is disposed over the entire inner surface 110A of the outer section 110. The inner surface 110A of the outer section 110 is adapted to face the electronic device 3 when the device 3 is mounted in the mounting system 100. An outer surface 110B of the outer section 110 is adapted to face a surface of the case 2 where the mounting system 100 is attached. Thus, when the electronic device 3 is mounted in mounting system 100, the perimeter suspension section 120 is disposed between the electronic device 3 and the outer section 110.

With reference to FIG. 8, the outer section 110 includes a central portion 113 that is substantially planar. Surrounding the central portion 113 is an outer portion 114 that is inclined relative to the central portion 113 in a direction toward the inner surface 110A of the outer section 110. The outer portion 114 may be formed to have a radius of curvature. The perimeter suspension section 120 is disposed on the inner surface 110A of the outer section 110 such that a spring portion 126 is positioned adjacent to the outer portion 114 of the outer section 110. The spring portion 126 is provided about the periphery of the perimeter suspension section 120 and includes a plurality of protrusions 122 in the form of, for example, ribs that serve to provide additional impact protection to the device 3.

Similar to the embodiment shown in FIGS. 1-5, the outer section 110 and the perimeter suspension section 120 are adapted to secure the electronic device 3 when mounted in the mounting system 100. The central portion 113 of the outer section 110 has dimensions such that the central portion 113 is essentially coextensive with the electronic device 3. The outer portion 114 of the outer section 110, by way of its incline relative to the central portion 113, extends around the edges of the electronic device 3. The perimeter suspension section 120 is adapted to fit around the periphery of the electronic device 3 and to hold the device 3 in place by way of a flange 121. The flange 121 is provided around the periphery of the perimeter suspension section 120 and covers a portion of the front surface of the device 3 when the device 3 is mounted in the mounting system 100.

The outer section 110 may include device openings 311 to provide access to switches, ports, and buttons required for the operation of the device 3. The perimeter suspension section 120 also includes device openings 123 and buttons 124 to provide access to switches, ports, and buttons required for the operation of the device 3.

The outer section 110 may be formed of a rigid material, for example polycarbonate. The perimeter suspension section 120 may be formed of any suitable material that provides impact protection to the electronic device 3 on account of being formed in a shape that functions as a spring, thereby making it more shock absorbent than a solid layer of material. Preferably the perimeter suspension section 120 is made of an elastic material, for example a silicone or a thermoplastic polyurethane (TPU). More preferably, the perimeter suspension section 120 is a thermoplastic polyurethane (TPU) having a durometer of 70 according to the ASTM D12240 type A scale.

Figure 9:
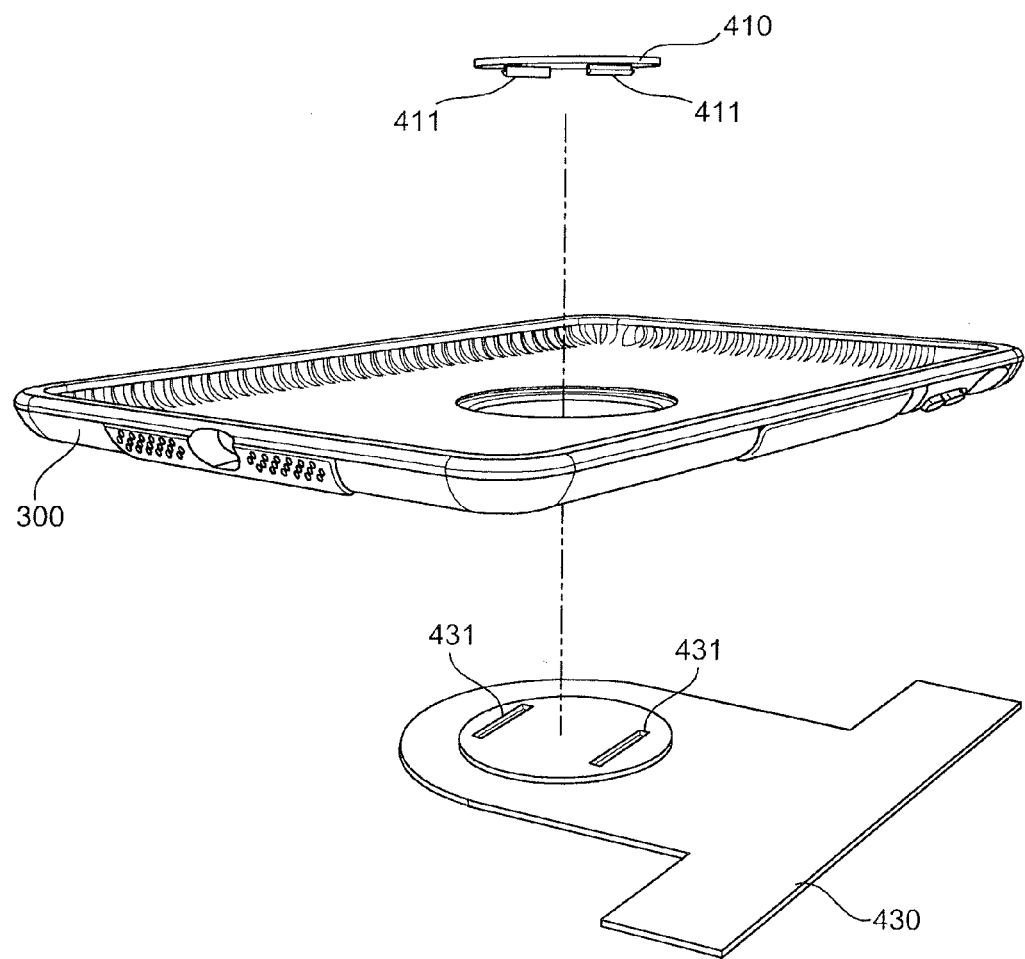
FIG. 9 is an exploded view of a third embodiment of a mounting system showing a pivot assembly for the mounting system.
Figure 10C:
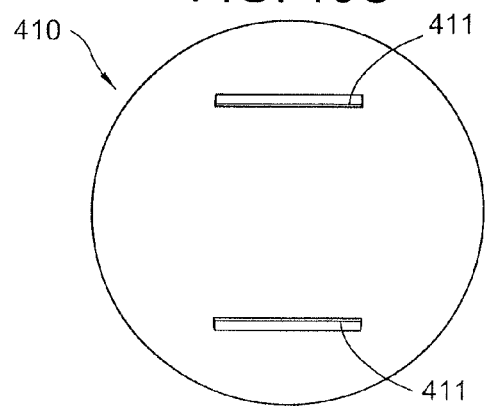
FIG. 10C is a top view of the cap of the pivot assembly shown in FIG. 9.
Figure 10D:
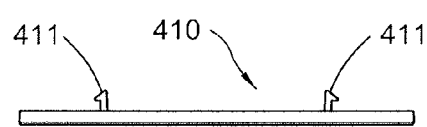
FIG. 10D is a left side view of the cap of the pivot assembly shown in FIG. 9.
Figure 10B:
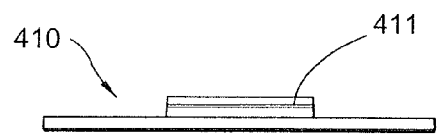
FIG. 10B is a front view of the cap of the pivot assembly shown in FIG. 9.
Figure 10A:
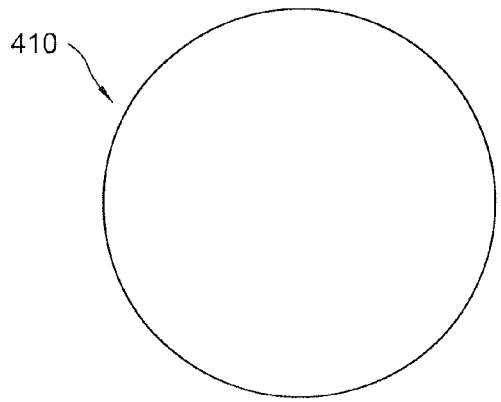
FIG. 10A is a bottom view of a cap of the pivot assembly shown in FIG. 9.
Figure 13:
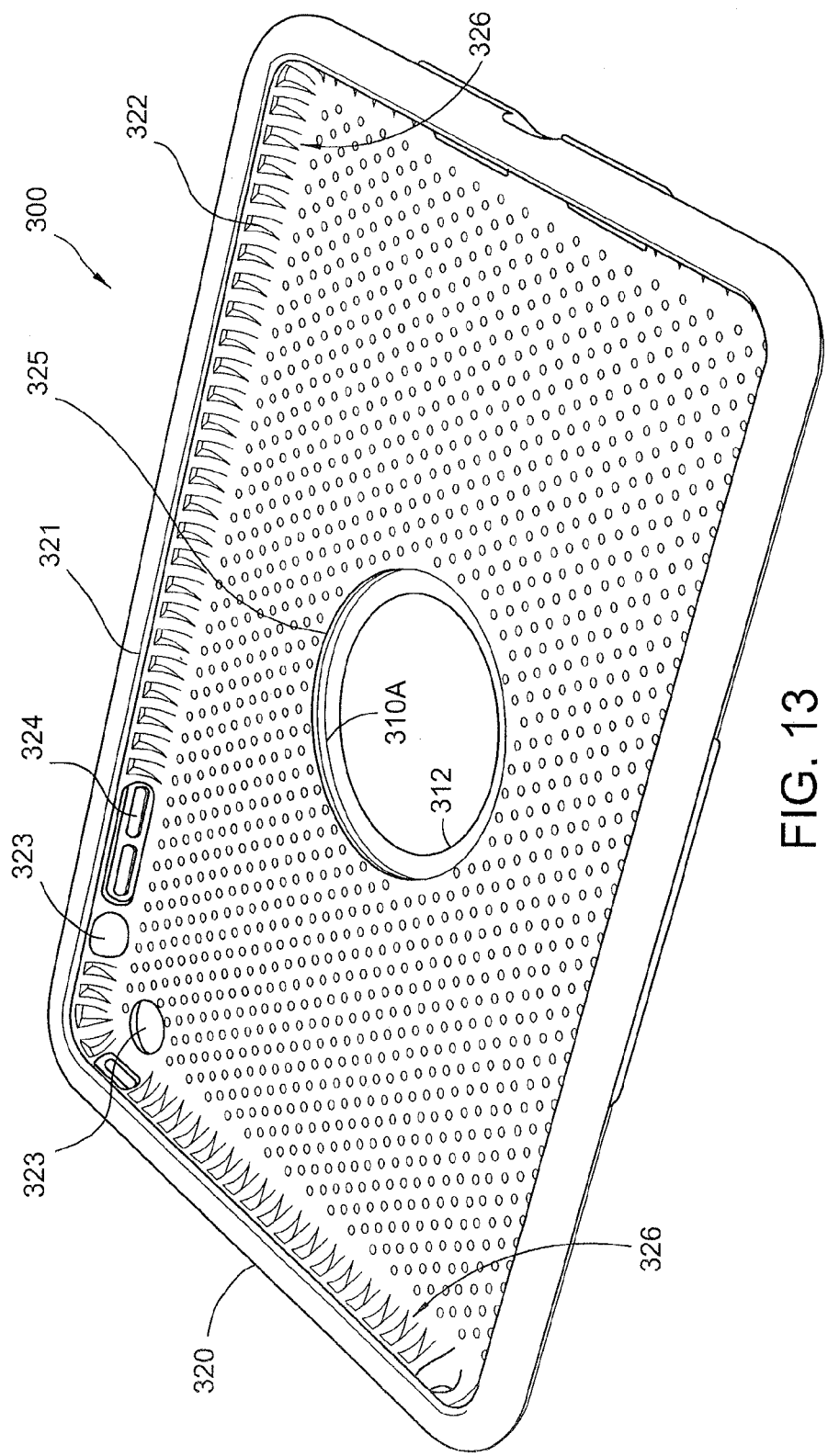
FIG. 13 is a top perspective view of the mounting system shown in FIG. 9.

FIG. 9 shows another embodiment of a mounting system 300 with additional structure for integrating the mounting system 300 into the tablet case 2. According to the embodiment, the mounting system 300 includes an outer section 310 co-molded with a perimeter suspension section 320. Similar to the embodiments shown in FIGS. 1 and 6, the perimeter suspension section 320 is disposed over the entire inner surface 310A, of the outer section 310, as shown in FIGS. 9 and 13. The inner surface 310A of the outer section 310 is adapted to face the electronic device 3 when the device 3 is mounted in the mounting system 300. An outer surface 310B of the outer section 310 is adapted to face a surface of the case 2 where the mounting system 300 is attached. Thus, when the electronic device 3 is secured in mounting system 300, the perimeter suspension section 320 is disposed between the electronic device 3 and the outer section 310.

Figure 14:
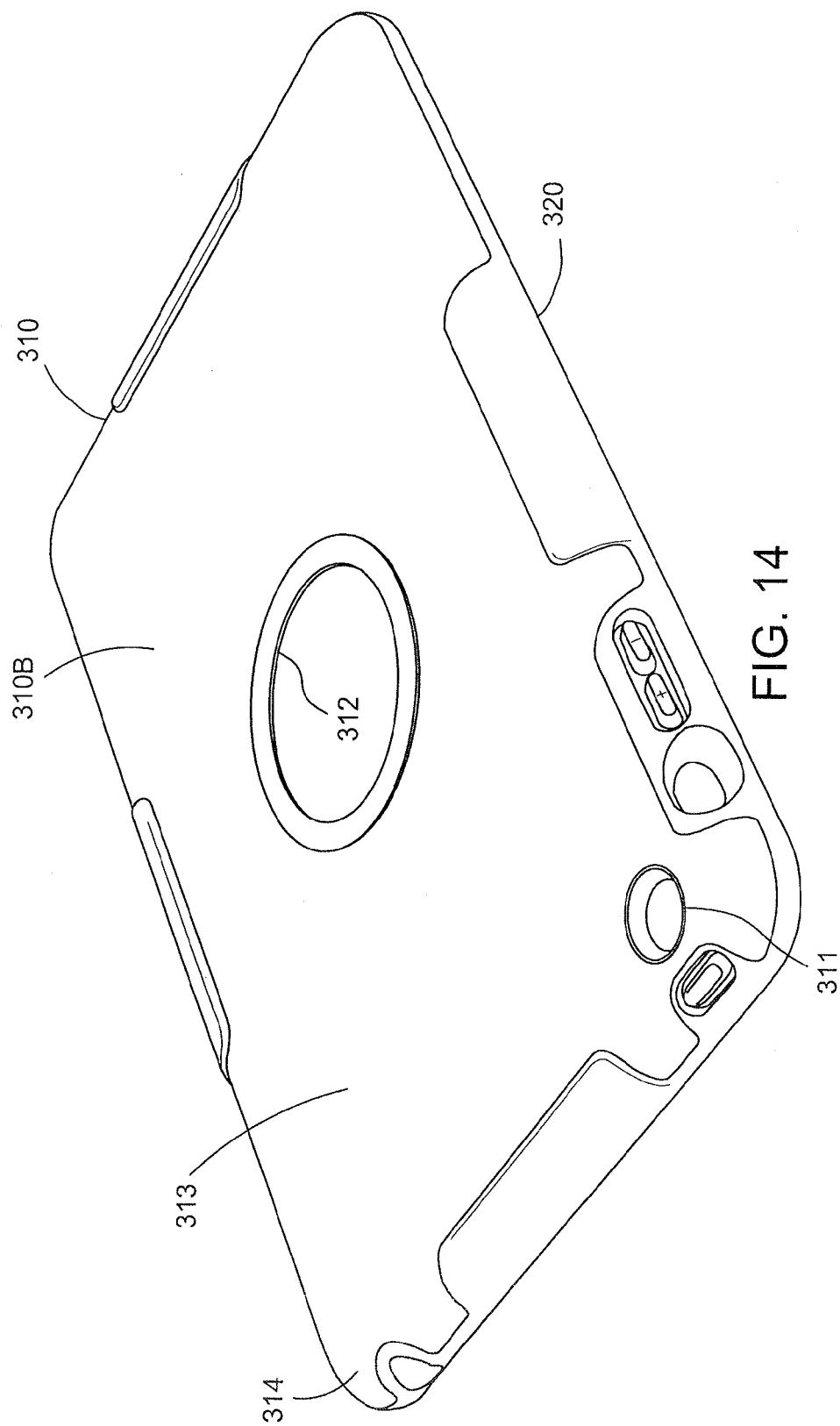
FIG. 14 is a bottom perspective view of the mounting system shown in FIG. 9.

With reference to FIGS. 13 and 14, the outer section 310 includes a central portion 313 that is substantially planar. Surrounding the central portion 313 is an outer portion 314 that is inclined relative to the central portion 313 in a direction toward the inner surface 310A of the outer section 310. The outer portion 314 may be formed to have a radius of curvature. The perimeter suspension section 320 is disposed on the inner surface 310A of the outer section 310 such that a spring portion 326 is positioned adjacent to the outer portion 314 of the outer section 310. The spring portion 326 is provided about the periphery of the perimeter suspension section 320 and includes a plurality of protrusions 322 in the form of, for example, ribs that serve to provide additional impact to the device 3.

The outer section 310 and the perimeter suspension section 320 are adapted to secure the electronic device 3 when mounted in the mounting system 300. The central portion 313 of the outer section 310 has dimensions such that the central portion 313 is essentially coextensive with the electronic device 3. The outer portion 314 of the outer section 310, by way of its incline relative to the central portion 313, extends around the edges of the electronic device 3. The perimeter suspension section 320 is adapted to fit around the periphery of the electronic device 3 and to hold the device 3 in place by way of a flange 321. The flange 321 is provided around the periphery of the perimeter suspension section 320 and covers a portion of the front surface of the device 3 when the device 3 is secured in the mounting system 300.

The outer section 310 is co-molded with the perimeter suspension section 320. The outer section 310 may include device openings 311 to provide access to switch s ports, and buttons required for the operation of the device 3. The perimeter suspension section 320 may also include device openings 323 and buttons 324 to vide access to switches, ports, and buttons required for the operation of the device 3.

The outer section 310 may be formed of a rigid material, for example polycarbonate. The perimeter suspension section 320 may be formed of any suitable material that provides impact protection to the electronic device 3 on account of being formed in a shape that functions as a spring, thereby making it more shock absorbent than a solid layer of material. Preferably, the perimeter suspension section 120 is made of an elastic material, for example a silicone or a thermoplastic polyurethane (TPU). More preferably, the perimeter suspension section 320 is a thermoplastic polyurethane (TPU) having a durometer of 70 according to the ASTM D2240 type A scale.

Figure 17:
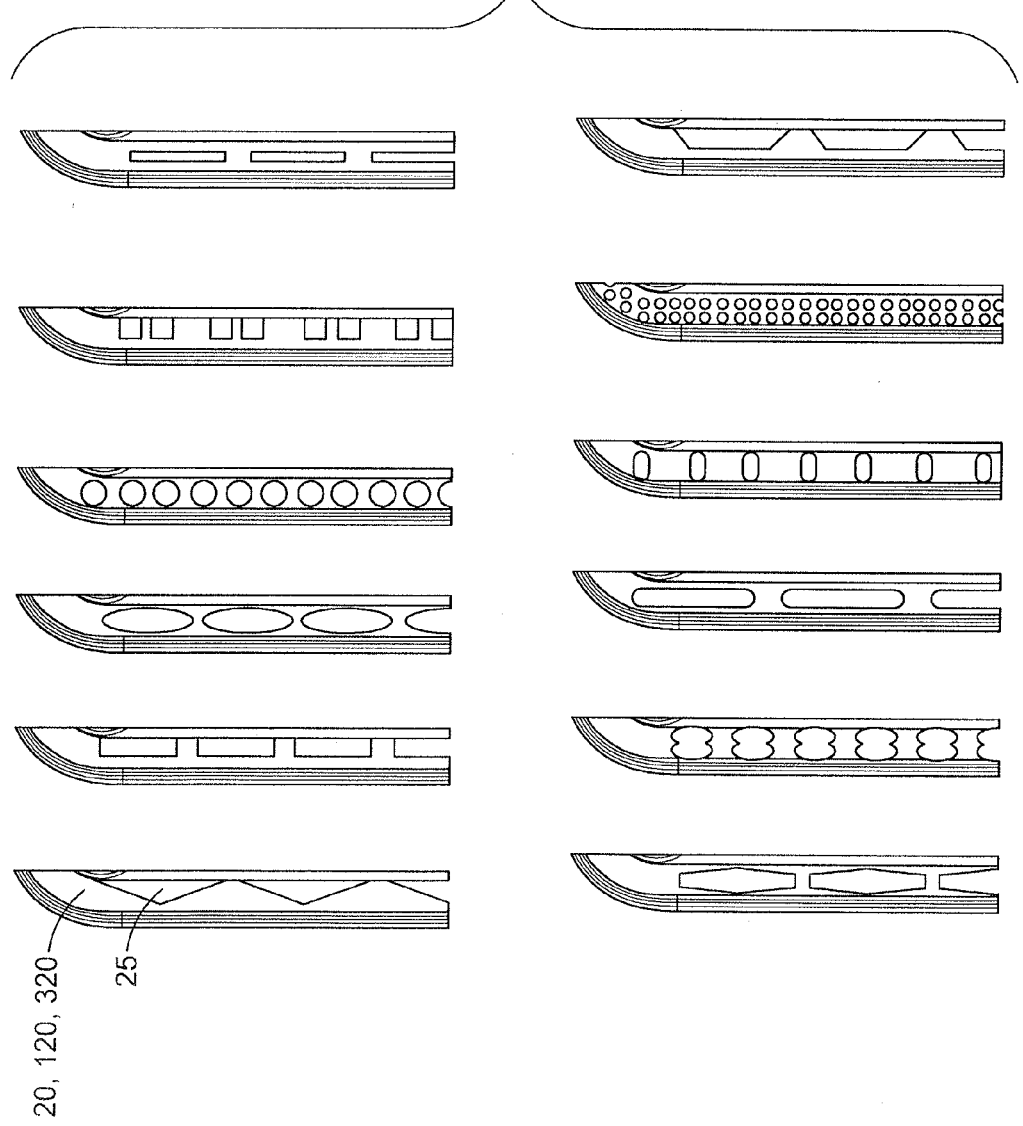
FIG. 17 is a top view of different examples of voids in a perimeter suspension section.

As shown in FIG. 17, voids 25 in the perimeter suspension section 20, 120, 320 can have several alternative structures. For instance, the voids 25 may be provided around the periphery of the perimeter suspension section 20, 120, 320 and may have a shape of, for example, a circle, triangle, rectangle, slit, hexagon, oval, or trapezoid. The perimeter suspension section 20, 120, 320 can include voids 25 that each have the same size and shape or that each have different sizes and shapes.

Mounting systems for electronic devices according to embodiments can be integrated into cases. According to one example, shown in FIGS. 3, 6, and 7, the case 2 includes a front cover 201 that is attached via an articulable, pivotable, foldable spine portion 206 to a rear cover 202. The spine portion 206 is arranged such that the front cover 201 and the rear cover 202 can be folded relative to each other to close the case 2 to contain the electronic device 3. In a closed state, the inner surfaces of the front cover 201 and the rear cover 202 face each other and can sandwich the electronic device 3 between each other. The front cover 201 and the rear cover 202 are arranged substantially parallel to each other. In an open state, a display of the electronic device 3 is exposed, and the front cover 201 can be opened at various angles towards the rear cover 202. At least one of the front cover 201 and the rear cover 202 can also be equipped with a mechanism to hold the front cover 201 and the rear cover 202 together in a closed state, for example, an elastic band, a hook and loop fastening strap, a zipper, magnetic strap, buckle, clip-on band, and push-button band laces. As shown in FIG. 12, the rear cover 202 is provided with a strap 208 for attaching to the front cover 201 in a closed state. In addition, the rear cover 202 is also configured to be foldable separately from the folding of the front and rear covers 201, 202 relative to each other. For this purpose, rear cover 202 is composed of a middle rear cover 203 and an exterior rear cover 204 that are connected to each other via a folding portion 205. In the embodiments shown folding portion 205 splits the rear cover 202 such that the middle rear cover 203 is larger than the exterior rear cover 204. Preferably, reference to FIG. 11, a length L2 of the middle rear cover 203 is three times larger than a length L1 of the exterior rear cover 204.

Mounting systems according to embodiments can be secured in a tablet case in several different ways known by those of ordinary skill in the art. For example, embodiments of the mounting system could be secured by: adhesives (e.g., liquid, gel, spray, or tape) stitching; mechanical fasteners (e.g., rivets, bolts, or screws); welding (e.g., ultrasonic or heat); magnets; overmolding; molded snap features; elastic bands (e.g., fabric or molded rubber); microsuction material; hook and loop fasteners; or a pocket formed on an inner surface of the case. With reference to FIG. 3, the case 2 includes an attachment portion 207 on an inner surface of the exterior rear cover 204 for securing the mounting system 1 by at least one of the structures described above.

With reference to FIGS. 9-16, the mounting system 300 can be integrated into a tablet case 2 with a pivot assembly, which includes a cap 410 and a pivot/core 430. The pivot/core 430 may be integrated into the tablet case 2, for example, by being sewn together with the tablet case 2, or by other suitable ways known by those of ordinary skill in the art. As shown in FIG. 11, the pivot/core 430 is attached to an inner surface of the exterior rear cover 204 at the attachment portion 207. The mounting system 300 may then be attached to the case 2 by the cap 410, which is adapted to be coupled to the pivot/core 430. As shown in FIGS. 10, 15, and 16, the cap 410 may be provided with projections 411, and the pivot/core 43 may be provided with corresponding recesses 431. The projections 411 are adapted to be secured in the recesses 431, for example, by being press fit or snap fit therein. The cap 410 and pivot/core 430 are preferably formed of a rigid material including, for example, polycarbonate.

To provide for the integration of the mounting system 300 into the case 2 by the pivot assembly, the perimeter suspension section 320 is provided with a mount opening 325 and the outer section 310 is provided with a corresponding mount opening 312. When assembling, as shown in FIG. 9, the cap 410 is positioned on the inside of the mounting system 300, passing through the mount openings 325, 312 of the perimeter suspension section 320 and outer section 310, respectively. The pivot/core 430, which is integrated into the case 2, is then attached to the cap 410 through the mount openings 312 by way of the projections 411 of the cap 410 and the recesses 431 of the pivot/core 430. Alternatively, the attachment between the cap 410 and pivot/core 430 can no achieved by any suitable structure known by those skilled in the art.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A protective case for an electronic device, comprising:
a front cover;
a rear cover including a middle rear cover, an exterior rear cover, and a folding portion that connects the middle rear cover to the exterior rear cover;
a spine portion that connects the front cover to the rear cover; and
a mounting system comprising:
an outer section having an inner surface and an outer surface, the inner surface adapted to face the electronic device when the electronic device is mounted in the mounting system; and
a perimeter suspension section coupled to the outer section and adapted to secure the electronic device to the mounting system, the perimeter suspension section including a spring portion provided around a periphery of the perimeter suspension section, the spring portion adapted to isolate the electronic device from a shock force applied to the mounting system,
wherein the mounting system is coupled to an attachment surface of the exterior rear cover.

2. The protective case of claim 1, wherein the mounting system is attached to the exterior rear cover by an adhesive disposed between the outer surface of the outer section and the attachment surface of the exterior rear cover.

3. The protective case of claim 1, wherein the outer section comprises:
a central portion that is substantially planar, and
an outer portion surrounding the central portion and being inclined relative to the central portion in a direction toward the inner surface of the outer section,
wherein the perimeter suspension section is disposed on the inner surface of the outer section such that the spring portion is positioned adjacent to the outer portion of the outer section.

4. The protective case of claim 3, wherein the outer portion has a radius of curvature.

5. The protective case of claim 3, wherein the central portion is substantially coextensive with the electronic device secured in the mounting system.

6. The protective case of claim 1, wherein the perimeter suspension section is co-molded with the outer section.

7. The protective case of claim 1, wherein the spring portion comprises a plurality of voids extending only partially through a thickness of the perimeter suspension section.

8. The protective case of claim 7, wherein the voids have a shape selected from the group consisting of a circle, a triangle, a rectangle, a slit, a hexagon, an oval, and a trapezoid.

9. The protective case of claim 1, wherein the spring portion comprises a plurality of voids, wherein the voids comprise through holes extending through the entire thickness of the perimeter suspension section.

10. The protective case of claim 1, wherein the perimeter suspension section is disposed on the entire inner surface of the outer section such that when the electronic device is mounted in the mounting system, the electronic device does not contact the outer section.

11. The protective case of claim 1, wherein the outer section is composed of a rigid material.

12. The protective case of claim 11, wherein the perimeter suspension section is composed of an elastic material.

13. The protective case of claim 12, wherein the perimeter suspension section is co-molded with the outer section.

14. The protective case of claim 1, comprising a mount opening for attaching the mounting system to a case.

15. The protective case of claim 14, wherein the perimeter suspension section is disposed on the entire inner surface of the outer section, and
wherein the outer section comprises a first opening and the perimeter suspension section comprises a second opening concentric with the first opening, the mount opening being formed by the first opening and the second opening.

16. The protective case of claim 1, further comprising:
a plurality of device openings formed in the outer section to provide access to the electronic device.

17. The protective case of claim 1, wherein the mounting system comprises a flange adapted to secure the electronic device.

18. The protective case of claim 1, wherein the attachment surface is substantially coextensive with the exterior rear cover.

19. The protective case of claim 1, wherein the middle rear cover has a larger surface area than the exterior rear cover.

20. The protective case of claim 19, wherein the exterior rear cover has a first length measured in a first direction and the middle rear cover has a second length measured in the first direction, the second length being at least two times that of the first length.

21. The protective case of claim 1, wherein the outer section is composed of a polycarbonate material.

22. The protective case of claim 1, wherein the perimeter suspension section is composed of a silicone or a thermoplastic polyurethane material.

23. The protective case of claim 1, wherein, when the protective case is in an open state, the exterior rear cover is adapted to be opened at various angles with respect to the front cover.

24. The protective case of claim 1, wherein the electronic device is a tablet.

* * * * *